(12) United States Patent
Stamey, Jr. et al.

(10) Patent No.: US 6,712,870 B1
(45) Date of Patent: Mar. 30, 2004

(54) SEALS FOR AIR FILTERS

(75) Inventors: Willie Luther Stamey, Jr., Kings Mountain, NC (US); Robert Sean Cunningham, Charlotte, NC (US)

(73) Assignee: Dana Corporation, Ottawa Lake, MI (US)

(*) Notice: Subject to any disclaimer, the term of this patent is extended or adjusted under 35 U.S.C. 154(b) by 41 days.

(21) Appl. No.: 09/996,808

(22) Filed: Nov. 30, 2001

(51) Int. Cl.[7] ............................................... B01D 46/02
(52) U.S. Cl. ......................... 55/498; 55/357; 55/385.3; 55/499; 55/501; 55/502; 55/510
(58) Field of Search ..................... 55/385.3, 498, 55/499, 501, 502, 510, DIG. 28, 357; 123/198 E

(56) References Cited

U.S. PATENT DOCUMENTS

| | | | |
|---|---|---|---|
| 4,222,755 A | * 9/1980 | Grotto | ........................ 55/502 |
| 4,445,915 A | * 5/1984 | Robinson | ..................... 55/502 |
| 4,886,533 A | 12/1989 | Sakashita et al. | |
| 5,066,318 A | 11/1991 | McDonough | |
| 5,071,456 A | * 12/1991 | Binder et al. | ................. 55/502 |
| 5,275,636 A | 1/1994 | Dudley et al. | |
| 5,415,677 A | * 5/1995 | Ager et al. | ..................... 55/502 |
| 5,484,466 A | 1/1996 | Brown et al. | |
| 5,487,767 A | * 1/1996 | Brown | ......................... 55/502 |
| 5,547,480 A | 8/1996 | Coulonvaux | |
| 5,556,440 A | * 9/1996 | Mullins et al. | ................ 55/498 |
| 5,755,843 A | 5/1998 | Sundquist | |
| 6,099,606 A | 8/2000 | Miller et al. | |
| 6,159,261 A | * 12/2000 | Binder et al. | .................. 55/502 |
| 6,447,567 B1 | * 9/2002 | Ehrenberg | ..................... 55/498 |

* cited by examiner

Primary Examiner—Duane Smith
Assistant Examiner—Jason M. Greene
(74) Attorney, Agent, or Firm—Millen, White, Zelano & Branigan, P.C.

(57) ABSTRACT

An annular air filter utilizes an end gasket which is snap fitted to a metal end cap. The gasket has a sealing lip with a radially extending, axially facing sealing face for sealing with a filter housing; and an annular, axially extending body portion. The annular, axially extending body portion has an axially extending, radially facing sealing surface for sealing with an air outlet pipe projecting into the housing. The gasket is made of foam rubber, rubber or polyurethane material and is optionally fixed on the air filter element with adhesive.

8 Claims, 3 Drawing Sheets

SEALS FOR AIR FILTERS

FIELD OF THE INVENTION

The present invention is directed to seals for air filters.

More particularly, the present invention is directed to air filters for internal combustion engines having a lip seal which fits around an air outlet pipe.

BACKGROUND OF THE INVENTION

Heavy duty air filters used with internal combustion engines for trucks and relatively large earth moving equipment and construction equipment currently use lip seals to seal around air outlet pipes through which filtered engine air is conveyed for combustion. In accordance with the current design, an encapsulated rubber end cap has a radial seal portion thereon engaging the outlet pipe. Material costs for current designs are relatively high and manufacturing complications are introduced because the seal and end caps are unitary, made entirely of polyurethane and are both rather soft. Additional manufacturing complications are introduced because the seal area must be cleaned to remove plastisol and other debris, and because silicone grease is applied so that the soft seal will slide over an outlet pipe of the housing in which the filter is mounted. Since both the seal and end cap are made of polyurethane, both are soft. It is desirable to reduce manufacturing costs and complications and to have a seal and end cap configuration which is more robust.

SUMMARY OF THE INVENTION

The present invention is directed to an air filter comprising an annular filter element having an annular filter media with first and second ends closed by first and second annular end caps. A gasket is seated within the first end of the filter media in an initial snap fit with the first end cap. The gasket comprises a unitary body of resilient material having a radially extending flange portion for overlying a radially extending portion of the end cap and has an axially extending body portion. An annular outwardly facing groove in the axially extending body portion of the unitary body receives the axially extending portion of the end cap therein to thereby provide mechanical locking of the gasket on the end cap. An internally facing sealing surface is provided on the axially extending body portion for engaging an air inlet pipe and a tapered portion on the unitary body extends from the groove in a direction away from the radial flange for facilitating insertion of the gasket within the first end of the filter media.

In a further aspect of the invention, the gasket is made of rubber, foam rubber or polyurethane, and in still another aspect of the invention, the gasket is secured by adhesive after it is snap-fitted within the first end of the filter element.

DETAILED DESCRIPTION

Figure 1:
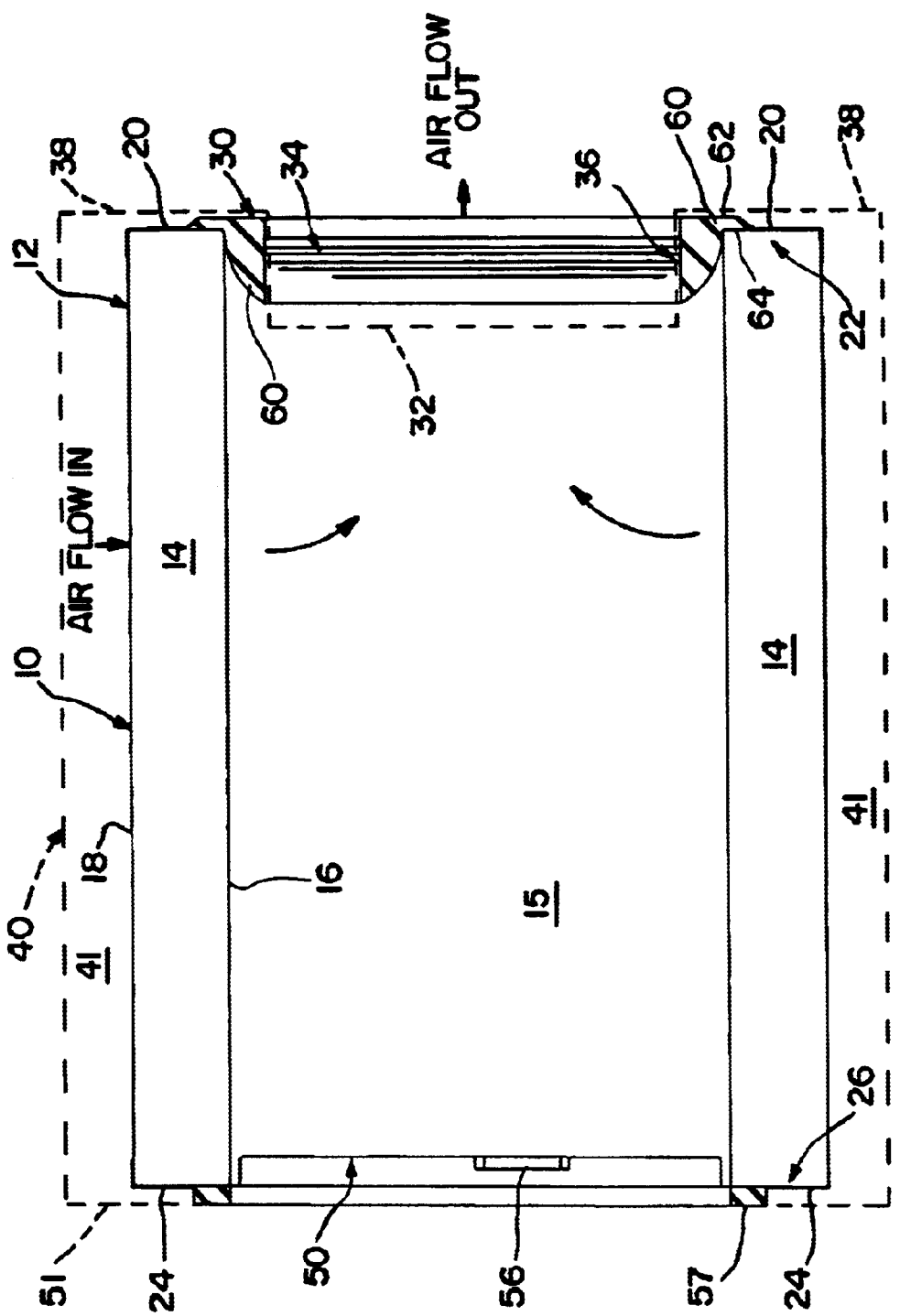
FIG. 1 is a side elevation of an air filter configured in accordance with the principles of the present invention.

Referring now to FIG. 1, there is shown air filter 10 configured in accordance with the principles of the present invention. The air filter includes filter element 12 that is comprised of annular pleated filter media 14 with a hollow core 15 that is disposed between an inner perforated liner 16 made of expanded metal and an outer perforated liner 18 also made of expanded metal. A first metal end cap 20 is fixed over the first end 22 filter media 14 while a second metal end cap 24 is fixed over a second end 26 of the filter media in order to seal the ends of the filter media so that air does not flow an axial direction through the filter media. A preferred material for the metal end plates 20 and 24 is a galvanized steel such as GALVANEL®, however any metal or hard plastic may be used. The first and second ends 22 and 26, the filter media 14 also correspond to the first and second ends of the filter element 12 itself.

Filter element 12 has a gasket 30 configured in accordance the present invention disposed its first end 22 for receiving an air outlet pipe 32 through an opening 34 defined by inwardly facing surface 36 of the gasket 30. The air outlet pipe 32 communicates with the hollow core 15 of the filter media 14 and projects from an end wall 38 of a filter housing 40 (shown in dotted lines) which surrounds the air filter 10 and provides an annular space 41 which receives input combustion air in accordance with standard practice.

Figure 5:
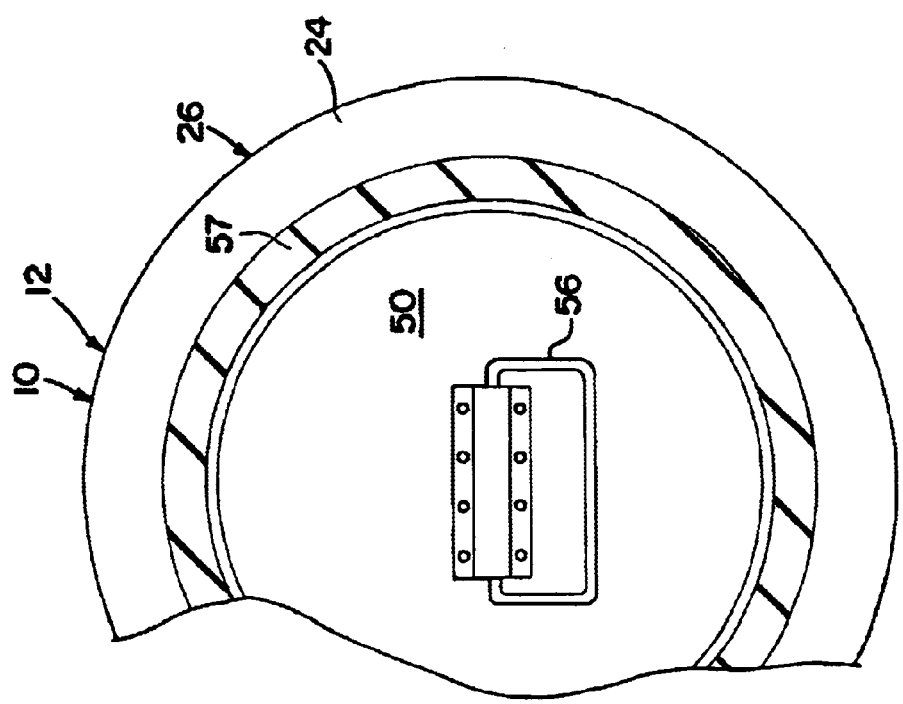
FIG. 5 is an end view of the closed end of the filter of FIG. 1.

The second end 26, the filter element 12 is closed by circular end plate 50 (see also FIG. 5). End plate 50 is bonded to end cap 24 and includes a loop 56 for extracting the filter 10 from the housing 40 by pulling the filter 10 off the air outlet pipe 30. A gasket 57 is disposed over the outer surface of the end plate 50 for abutment by a closure 51 of the housing 40 in order to keep the filter 10 positively retained within the housing. When it is time to withdraw the filter 10 from the housing 40 by pulling on the loop 56, problems are encountered with the prior art because the prior art utilizes gasket that bounds with the air outlet pipe.

Figure 2:
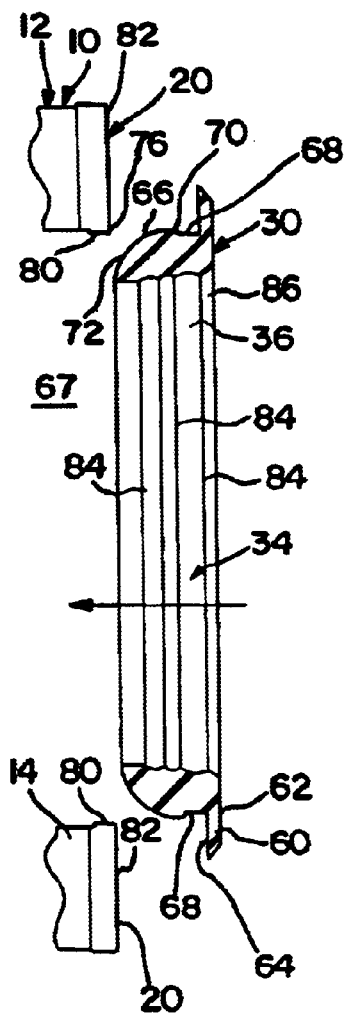
FIG. 2 is a side elevation of an annular gasket positioned for insertion into an end cap of a filter in accordance with the present invention.
Figure 3:
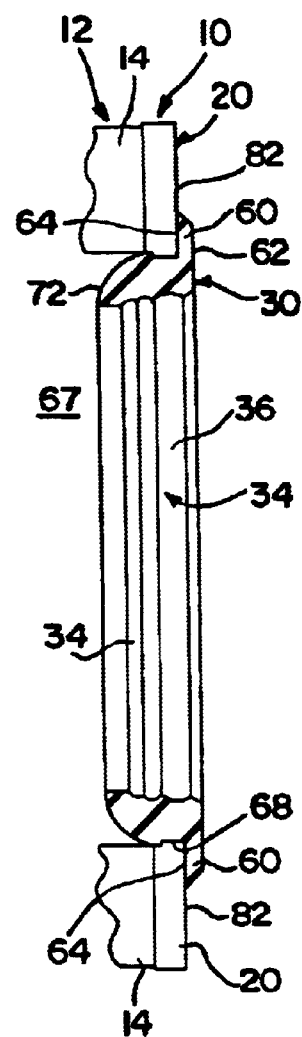
FIG. 3 is a side elevation showing the gasket snap-fitted to the end cap.
Figure 4:
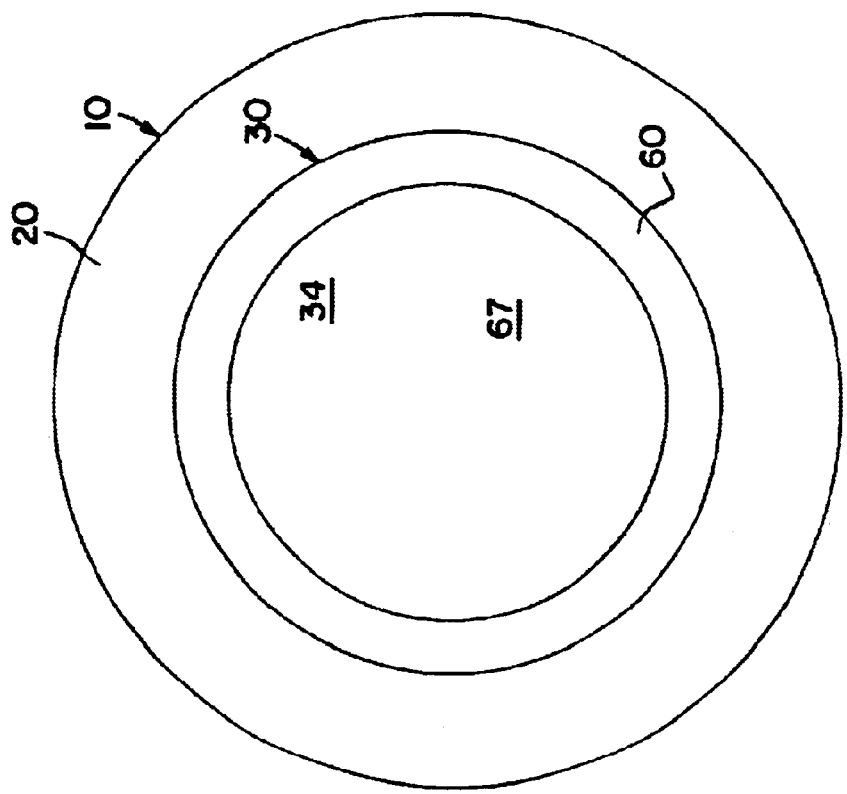
FIG. 4 is an end view of the end cap shown in FIGS. 2 and 3.

As is best seen in FIGS. 2–4, the gasket 30 configured in accordance with the present invention, is initially a separate piece from the end cap 20 and is snapped into engagement therewith. The gasket 30 is preferably made of a foamed material or sponge rubber material having a durometer in a range of 8–20. Considering FIGS. 2–4 in combination with FIG. 1, the gasket 30 has a radially extending lip 60 having first surface 62 which seals with the wall 38 (see FIG. 1) and a second surface 64 which seals with the end cap 20. Extending from the radially extending lip 60 is an axially extending body portion 66 which projects into the opening 67 defined by the end cap 20. The axially projecting body portion 66 has an annular groove 68 disposed just behind the lip 60 and extending from the sealing surface 64. The annular groove 68 is defined by a shoulder 70 from which a tapered surface portion 72 extends and tapers toward the opening 34 through the gasket 30. The tapered surface portion 72 is preferably actuate and engages annular corner 76 of end cap 20 which deforms the axially projecting portion 66 inwardly as is the gasket 30 is pressed through the circular opening 67 defined by an inner flange 80 of the first end cap 20. The axial length of the inner flange 80 is substantially equal to the axial length of the annular groove 68 so that concurrent with the surface 64 of lip 60 engaging the outer face 82 of the cap 20, the inner flange 80 fits within the groove 68 as the shoulder 70 snaps over the edge of the inner flange 80. Optionally, adhesive is disposed between the outer face 82 of the end cap 20 and the surface 64 and 68 of the gasket 30 to permanently retain the gasket after it is initially snapped into place. The interior surface 36 of the gasket 30 has ribs 84 for gearing against the air outlet pipe 32 in order to affect a long lasting seal. An initial frusto-conical surface 86 facilitates easy insertion of the air outlet pipe 32.

By having a separate gasket 30 which snaps into place, substantially greater design flexibility is achieved, enabling various production lines to manufacture the filters 10 instead of specialty manufacturing line necessary for utilization of the currently used encapsulated rubber lip seals.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An air filter comprising:
   an annular filter element disposed about an axis and having an annular filter media with first and second ends closed by first and second annular end caps;
   an annular gasket seated within the first end of the filter media in an initial snap fit with the first end cap, the annular gasket comprising:
      an annular unitary body of resilient material having a radially extending flange portion for overlying a radially extending portion of the end cap and having an axially extending body portion coaxial with the axis of the filter element;
      an annular outwardly facing groove in the axially extending body portion of the unitary body for receiving an axially extending portion of the end cap therein;
      an internally facing sealing surface for engaging an air outlet pipe, and
      a tapered portion on the unitary body extending from the groove in a direction away from the radial flange, the tapered portion having a surface tapering in a direction away from the flange and groove and toward the axis.

2. The air filter of claim 1 further including a circular end plate made of metal or plastic adhered to the second end of the filter media.

3. The air filter of claim 2 wherein the circular end plate has a pull tab thereon for pulling the air filter away from the air outlet pipe.

4. The air filter of claim 1 wherein the annular filter media is disposed between inner and outer liners of perforated metal.

5. The air filter of claim 1 wherein the gasket is retained on the first end of the filter element by adhesive after having been secured with an initial snap fit.

6. The air filter of claim 1 wherein the gasket is made of foam rubber.

7. The air filter of claim 1 wherein the internally facing sealing surface includes a plurality of annular ribs for engaging the outlet pipe.

8. The air filter of claim 1 wherein the gasket is made of rubber or polyurethane.

* * * * *